ures Patent Office 3,032,594
Patented May 1, 1962

3,032,594
PREPARATION OF DINITRODIPHENYLETHER
Jack L. Towle, Cleveland, Ohio, assignor to The Harshaw Chemical Company, Cleveland, Ohio, a corporation of Ohio
No Drawing. Filed Dec. 27, 1960, Ser. No. 78,305
5 Claims. (Cl. 260—612)

This invention relates to a method for the preparation of dinitrodiphenylether and more specifically to a higher yield preparation of a dinitrodiphenylether. Dinitrodiphenylether, and particularly the reduction product of dinitrodiphenylether, diaminodiphenylether, has been found to have a number of industrial applications. Diaminodiphenylethers are employed in the preparation of organic dyes and in the preparation of diisocyanates for polyurethane resins.

The best preparation of the prior art produces p,p'-dinitrodiphenylether in 45% yield and is a Williamson-type reaction carried out by the condensation of the sodium salt of p-nitrophenol with a great excess of p-nitrochlorobenzene. The reaction is as follows:

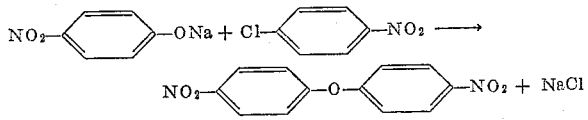

Because of the extremely low nucleophilic activity of the p-nitro-phenoxide ion, this reaction invariably produces low yields. A maximum yield of 45% has been obtained by the Williamson-type reaction when a 6:1 molar ratio of a chloro compound to the phenol was employed and the reaction temperatures kept in the range from 245° C. to 250° C. The use, however, of such great excess of chloronitrobenzene results in difficult removal operations of unreacted excess chloro compound. Failure to use large quantities of chloro compound will generally result in a yield of p,p'-dinitrodiphenylether in the range of from 10% to 20%.

It is, therefore, an object of this invention to prepare dinitrodiphenylether by means of a high yield reaction.

It is another object of this invention to prepare dinitrodiphenylether by means of a high yield reaction which does not require extensive purification procedures.

I have now found that it is possible to prepare certain isomers of dinitrodiphenylether in high yields by means of reacting an alkali salt of nitrophenol with nitrochlorobenzene in dimethyl sulfoxide solvent.

The increased yields resulting from the process of this invention are due to two factors: first, the relatively high dielectric constant of dimethyl sulfoxide and second, its powerful solvent action on both reactants. These characteristics of dimethyl sulfoxide make it especially unique for this type of ionic reaction and afford yields in ranges from about 70% to about 90%.

Table I is illustrative of the increased yields obtained from the use of dimethyl sulfoxide as compared with dimethylformamide, another solvent in which both reactants are soluble but which has a lower dielectric than dimethyl sulfoxide.

Table I

| Solvent | Dielectric Constant | Moles Solvent | Moles p-nitrochlorobenzene | Moles alkali salt of p-nitrophenol | | Yield, Percent |
|---|---|---|---|---|---|---|
| DMSO [1] | 45 | 1.10 | 0.13 | Potassium salt | 0.13 | 87.0 |
| DMSO [1] | 45 | 3.10 | 0.5 | Sodium salt | 0.5 | 71.5 |
| DMF [2] | 36 | 3.30 | 0.5 | Sodium salt | 0.5 | 39.5 |

[1] Dimethylsulfoxide.
[2] Dimethylformamide.

In general, the reaction of this invention is carried out by heating a mixture of 1 mole of an alkali metal salt of nitrophenol with from 1 to 2 moles of chloronitrobenzene and from 6 to 20 moles, and preferably from 8 to 10 moles, of dimethyl sulfoxide at reflux temperatures. The mixture is then cooled and drowned in an ice water bath and the crystalline material which separates is purified by suitable operations. The alkali metal salt of p-nitrophenol may be any alkali metal salt selected from the group consisting of lithium, sodium and potassium salts. The potassium salt has been found to give the best yields and is, therefore, the preferred salt of this invention.

The process of this invention is especially suitable for the preparation of any one of five isomers of dinitrodiphenylether which are p,p'-dinitrodiphenylether, o,o'-dinitrodiphenylether, o,p'-dinitrodiphenylether, m,p'-dinitrodiphenylether, and o,m'-dinitrodiphenylether. These isomers are prepared by employing the appropriate combination of chloro compounds selected from the group consisting of p-nitrochlorobenzene and o-nitrochlorobenzene and alkali metal salt of nitrophenols selected from the group consisting of o-nitrophenol, m-nitrophenol and p-nitrophenol. Preparation of m,m'-dinitrodiphenylether is extremely difficult because of the unreactivity of m-nitrochlorobenzene. The reactivity of the chloro compounds and the alkali metal salts of the nitrophenols are effected in exactly the opposite manner by the position of the nitro group. m-Nitrophenol is the most reactive of the nitrophenol series, while m-nitrochlorobenzene is the least reactive of the nitrochlorobenzene series.

The following specific examples are given for purposes of illustration and are not to be considered as limiting the spirit and scope of this invention:

Example I 23.4 grams (.13 mole) of the potassium salt of p-nitrophenol were placed in a 200 ml. 3-necked, round-bottomed flask fitted with a mechanical stirrer, a thermometer and a reflux condenser with drying tube. 20.5 grams (.13 mole) of p-nitrochlorobenzene and 82.5 grams (1.1 moles) of dimethyl sulfoxide were then added and the mixture was slowly heated to reflux temperature (174° C.) for 2 hours. During the refluxing period the color of the solution changed from red to brownish black and fine crystalline KCl separated out. The mixture was allowed to stand at room temperature overnight and was then refluxed for an additional 2 hours at 174° C. The mixture was then cooled to 75° C. and poured into 1 liter of ice water. Greenish-brown crystals separated and were slurried for 15 minutes and then filtered. The crystals were subjected to two additional washings and then slurried in 1 liter of 3% NaOH for 15 minutes and then again slurried with water. Unreacted p-nitrochlorobenzene was removed by steam distillation. The residue was again washed with 3% NaOH and then with water and then filtered and dried in an oven at 90° C. to 100° C. The yield of crude p,p'-dinitrodiphenylether was 30 grams (87% yield).

Example II 80.5 grams (.5 mole) of the sodium salt of p-nitrophenol were placed in a 500 ml. 3-necked, round-bottomed flask fitted with a mechanical stirrer, a thermometer and a reflux condenser. 78.8 grams (.5 mole) of p-nitrochlorobenzene and 240 grams (3.1 moles) of dimethyl sulfoxide were then added and the mixture was heated with stirring to a reflux temperature of 157° C. A Dean Stark trap was then inserted and the lower boiling material was removed until a pot temperature of 180° C. was reached. The solution which was brown-black was then refluxed for a total of 9¼ hours during which time fine granular NaCl precipitated out. The reaction mixture was then cooled to 40° C. and poured into 2.5 liters of ice water. The brown crystals which separated were slurried for 15 minutes and filtered. The crystals were subjected to two more water washings, slurried in 2 liters of 3% NaOH for 15 minutes and then slurried again in water. The crystals were then subjected to steam distillation to remove unreacted p-nitrochlorobenzene. The residue was again washed with 3% NaOH and then with water, filtered and oven dried at 90° C. to 100° C. to constant weight. The yield of crude p,p'-dinitrodiphenylether was 93 grams (71.5% yield).

Having thus described my invention, what I claim is:

1. A method for the preparation of a dinitrodiphenylether comprising reacting an alkali metal salt of nitrophenol with chloronitrobenzene in a dimethyl sulfoxide solvent, said dimethyl sulfoxide solvent being present in the range of from 6 to 20 moles of dimethyl sulfoxide per mole of alkali metal salt of nitrophenol.

2. The method of claim 1 wherein the nitrophenol is a nitrophenol selected from the group consisting of o-nitrophenol, m-nitrophenol and p-nitrophenol and the choloronitrobenzene is a chloronitrobenzene selected from the group consisting of p-nitrochlorobenzene and o-nitrochlorobenzene.

3. The method of claim 1 wherein said alkali metal salt of nitrophenol is an alkali metal salt selected from the group consisting of lithium, sodium and potassium alkali metal salts.

4. The method of claim 1 wherein said alkali metal salt of nitrophenol is potassium nitrophenol.

5. A method for the preparation of dinitrodiphenylether comprising reacting an alkali metal salt of nitrophenol with chloronitrobenzene in a dimethyl sulfxide solvent wherein the mole ration of the alkali metal salt of the nitrophenol to chloronitrobenzene is the range of 1:1 to 1:2 and wherein the mole ratio of the alkali metal salt of the nitrophenol to dimethyl sulfoxide is in the range of 1:6 to 1:20.

No references cited.